United States Patent
Wu et al.

(10) Patent No.: US 7,145,680 B2
(45) Date of Patent: Dec. 5, 2006

(54) TAB PRINTING IN A NETWORK CONTROLLER

(75) Inventors: Vincent Wu, Irvine, CA (US); Rohit Wadhwa, Lake Forest, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 843 days.

(21) Appl. No.: 10/156,263

(22) Filed: May 28, 2002

(65) Prior Publication Data

US 2003/0223088 A1 Dec. 4, 2003

(51) Int. Cl.
G06F 3/12 (2006.01)
G06F 15/00 (2006.01)
G06K 1/00 (2006.01)

(52) U.S. Cl. .............. 358/1.15; 358/1.1; 358/1.11; 358/1.12; 358/1.18; 347/19

(58) Field of Classification Search .......... 358/1.15
See application file for complete search history.

(56) References Cited

U.S. PATENT DOCUMENTS

| | | | |
|---|---|---|---|
| 4,974,035 A | 11/1990 | Rabb et al. | |
| 5,133,048 A * | 7/1992 | Parsons et al. | 358/1.12 |
| 5,337,161 A * | 8/1994 | Hube | 358/448 |
| 5,452,062 A | 9/1995 | Baldwin et al. | |
| 5,469,533 A | 11/1995 | Dennis | |
| 5,492,315 A | 2/1996 | Maruyama et al. | |
| 5,615,015 A * | 3/1997 | Krist et al. | 358/296 |
| 5,655,207 A | 8/1997 | Sugiyama et al. | |
| 5,722,029 A | 2/1998 | Tomidokoro et al. | |
| 5,906,397 A * | 5/1999 | MacWilliams et al. | 283/36 |
| 5,946,461 A * | 8/1999 | Landry et al. | 358/1.18 |
| 6,081,816 A | 6/2000 | Agrawal | |
| 6,163,784 A | 12/2000 | Taguchi | |
| 6,327,387 B1 | 12/2001 | Naoi et al. | |
| 6,327,599 B1 | 12/2001 | Warmus et al. | |
| 6,336,074 B1 * | 1/2002 | Woo | 701/208 |
| 2003/0074420 A1 * | 4/2003 | Hoshino et al. | 709/218 |

OTHER PUBLICATIONS

Hewlett Packard, HP PCL/PJL Reference—Printer Job Language Technical Reference Manual. Publication No. 5021-0380, Edition 12, Jun. 2003.

* cited by examiner

*Primary Examiner*—Twyler Lamb
*Assistant Examiner*—Yixing Qin
(74) *Attorney, Agent, or Firm*—Tucker Ellis & West LLP

(57) ABSTRACT

Architecture for providing tab printing for a computer platform. A text data stream is generated and transmitted from the computer platform to a print controller, which text data steam includes tab information. The text data stream is parsed at the print controller to extract the tab information. A tab image file of the tab information is created from the tab information at the print controller. A face file is created from the tab image file, ad forwarded to a peripheral output device, where the peripheral output device processes the face file to output a tab document having the tab information.

18 Claims, 2 Drawing Sheets

TAB PRINTING IN A NETWORK CONTROLLER

BACKGROUND OF THE INVENTION

This invention is related to tab printing, and more particularly for providing tab printing capability for both UNIX and Apple® computer platforms by utilizing a platform-compatible text file in a print language format that allows an intermediary print controller to output an associated image file to facilitate the output of tab documents by a peripheral output device.

Rapid technological advances in features addressing various document output formats provided by network peripheral devices is outpacing the operability with many of the mainstream computer platforms. New peripheral engines now provide the capability of printing on tab paper, thus interspersing the various tabbed documents throughout a document compilation as the compilation is being printed. Computer platforms based upon the Windows® operating system by Microsoft Corporation can use the functionality incorporated through the Windows printer driver. However, users of a UNIX or an Apple® platform do not have a mechanism by which to use this enhanced feature of the peripheral engine.

What is needed is a way for both UNIX and Apple clients to utilize the functionality provided for managing tab text.

SUMMARY OF THE INVENTION

The present invention disclosed and claimed herein, in one aspect thereof, comprises architecture for providing tab printing for a computer platform. A text data stream is generated and transmitted from the computer platform to a print controller, which text data steam includes tab information. The text data stream is parsed at the print controller to extract the tab information. A tab image file of the tab information is created from the tab information at the print controller. A face file is created from the tab image file, ad forwarded to a peripheral output device, where the peripheral output device processes the face file to output a tab document having the tab information.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The disclosed architecture solves the aforementioned problem by implementing the tab-printing feature in a print controller such that a UNIX platform and an Apple platform can take advantage of tab printing capabilities.

Figure 1:
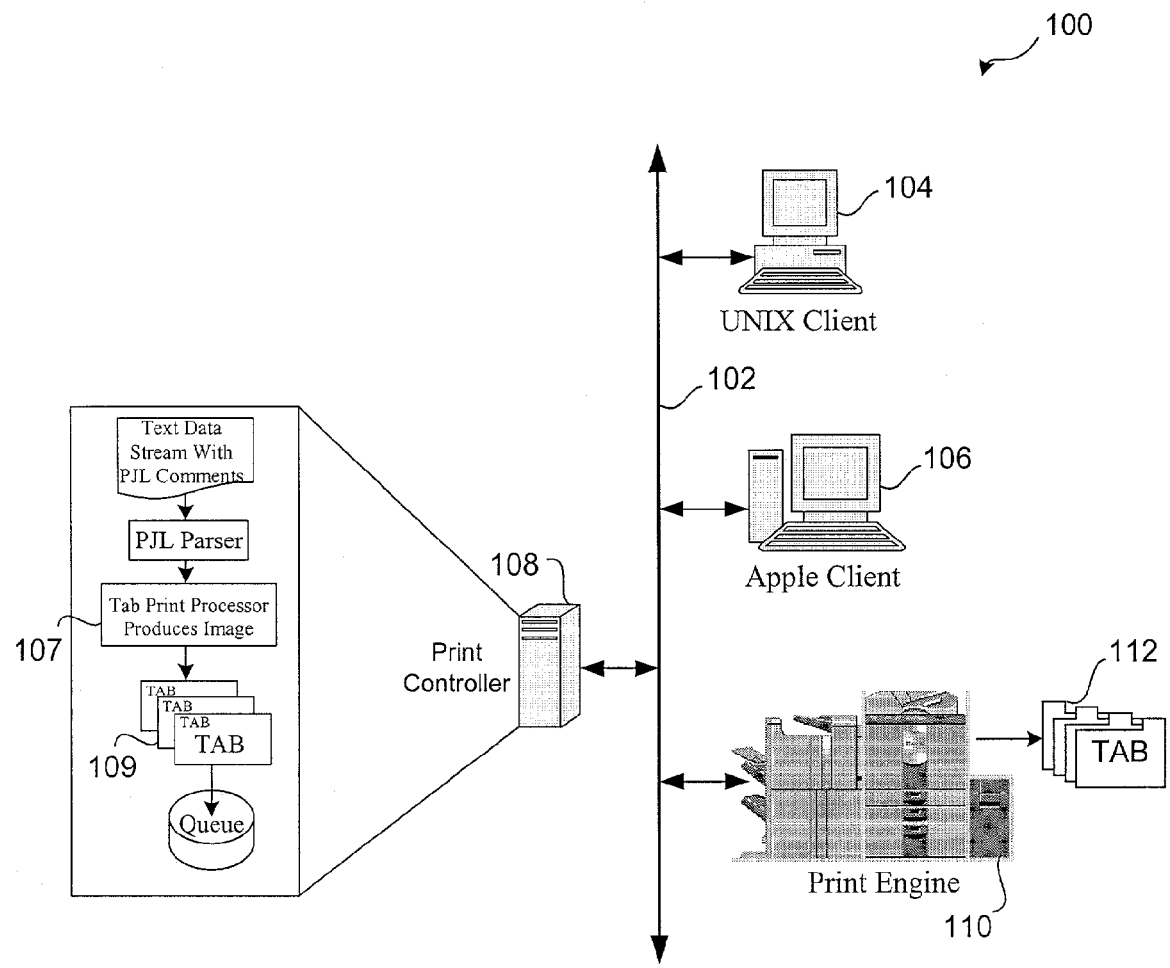
FIG. 1 illustrates a system block diagram of the platform independent implementation, according to a disclosed embodiment.

Referring now to FIG. 1, there is illustrated a system block diagram of the platform independent implementation, according to a disclosed embodiment. As illustrated, the system 100 includes a network 102 having disposed thereon a UNIX client 104 and an Apple client 106. The network 102 can be any conventional wired or wireless network including, for example, Ethernet, Token Ring, etc., over which communication is provided. The system 100 also includes a print controller 108 disposed on the network 102 for processing print commands in accordance with the disclosed novel architecture. The system 100 also includes a peripheral output device 110, for example, a network printer or a network multi-function output device (that provides faxing scanning, printing, etc.), to which print commands are sent to effect hardcopy output. Note that although the print controller 108 is shown as an external node on the network 102, it is appreciated that the print controller 108 can be suitably designed as an add-in board to the peripheral output device 110, such that the print commands are sent directly to the peripheral output device 110 for processing by the now internal print controller card.

The print controller 108 is configured to accept a number of different types of print job files, but in particular, a text file with a "Tab Print" option set in PJL (Printer Job Language) comments. However, all print jobs arriving at the print controller are interrogated for the "Tab Print" option. The use directs the print job to the printer controller, as is typically done for a print job. The PJL comments contain all of the tab information details needed to output one or more tab documents 112. The print controller 108 parses the tab information from the PJL comments, and using an imaging library (e.g., Lead Tools made by Lead Technologies), creates tab image information 107 using the tab text caption and the body text, according to the tab information specified in the PJL comments. The tab image information 107 is then overlaid onto corresponding face files 109 (a file where the image has now been rasterized), and printed, as is illustrated hereinbelow in FIG. 3.

Figure 2:
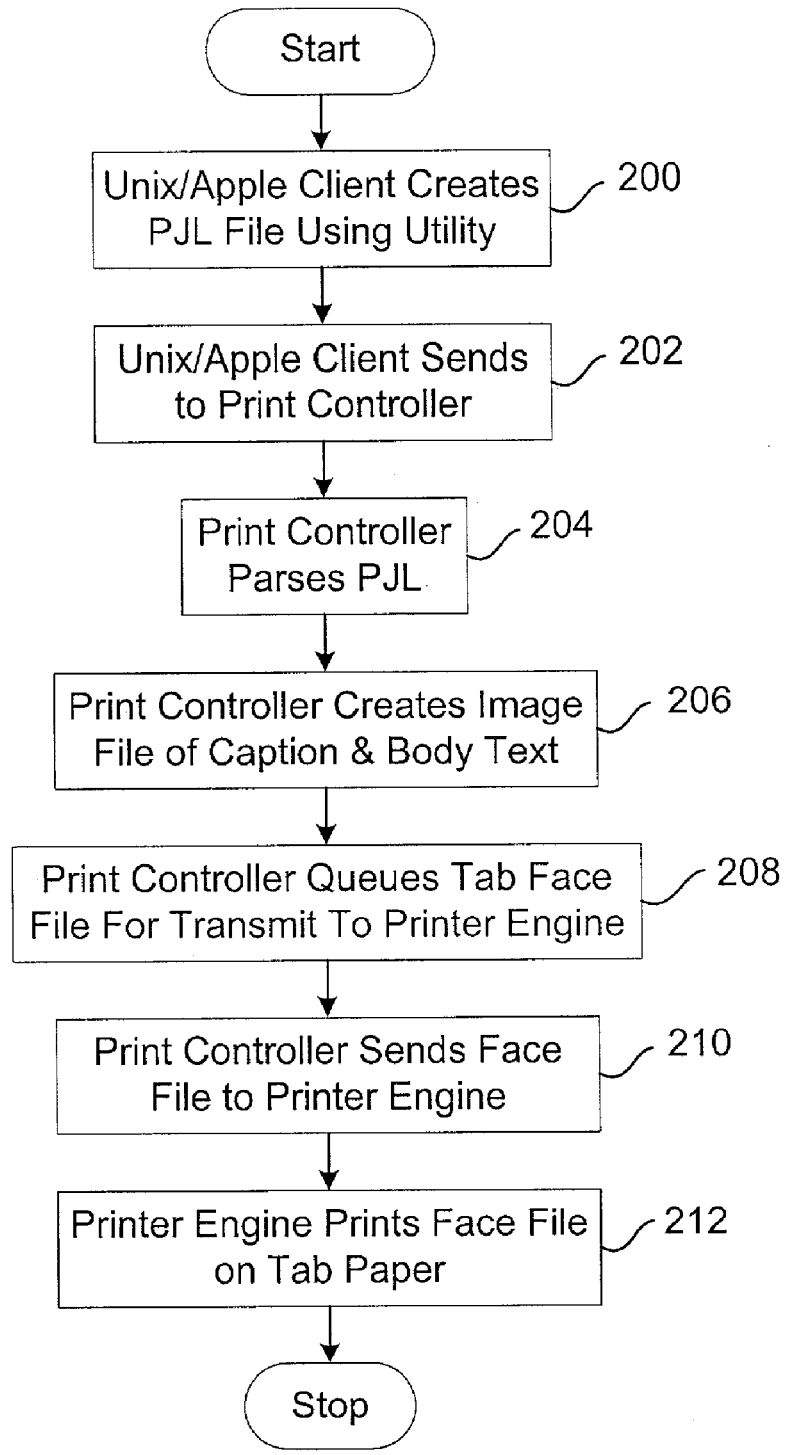
FIG. 2 illustrates a flow chart of the process for creating the tab text.

Referring now to FIG. 2, there is illustrated a flow chart of the process for creating the tab text. Flow begins at a function block 200 where a user of either the UNIX client 104 or the Apple client 106 invokes a print function. The PJL file is then created with the appropriate tab information comments contained therein, and transmitted in a text data stream to the print controller 108. Flow is then to a function block 202 where the client transmits the text data stream containing the PJL comments to the print controller 108. The print controller 108 then parses the PJL file from the data stream, as indicated in a function block 204. In a function block 206, the tab image file 107 is then created by a print processor of the print controller 108, which tab image file 107 contains tab information comprising the tab text caption and body text for the tab document(s) 112. The print controller 108 then creates face files 109 from the image files 107, and queues the face files 109 for output to the printer engine of peripheral output device 110, as indicated in a function block 208. In a function block 210, the print controller 108 sends the face files 109 to the printer engine of the peripheral output device 110. The printer engine of peripheral output device 110 then prints the face files 109 onto the hardcopy medium of the tab document 112, as indicated in a function block 212. Flow then reaches a Stop terminal.

A utility with a graphical user interface takes the following inputs, generates all the PJL comments, and saves those comments to a text file. The utility is an executable file that may be launched or invoked by typing the file name on the operating system shell. Inputs to or user selections of the utility include the following: Paper Size: LT/A4; Tab Paper Type: 5 Tabs/8 Tabs; Tab Position: 1–5/1–8; Tab Caption Text; Tab Caption Font Name/Style/Size; Tab Body Text; Tab Body Font Name/Style/Size; and Tab Body Orientation.

A sample text file with PJL comments follows showing the "Tab Print" option set, and including at least one full set of tab information for a first tab document 112 (i.e., associated with the TABPOSITION=1 code) in the format of PJL comments, and the start of a second tab document 112 (i.e., associated with the TABPOSITION=2 code).

_%-12345X@PJL JOB NAME="TabPrint"
@PJL COMMENT DSSC PRINT TABPAPERSIZE=LT
@PJL COMMENT DSSC PRINT TABPAPERTYPE=8
@PJL COMMENT DSSC PRINT TABPOSITION=1
@PJL COMMENT DSSC PRINT TABCAPTION="POLICIES"
@PJL COMMENT DSSC PRINT TABCAPFONT="Times","Bold",8
@PJL COMMENT DSSC PRINT TABBODY="POLICIES"
@PJL COMMENT DSSC PRINT TABBODYFONT="Times","Italic",24
@PJL COMMENT DSSC PRINT TABPOSITION=2
. . . and so on.

As indicated hereinabove, once the print controller 108 receives the PJL input, it parses the PJL comments from the data stream to extract all of the tab information. Using the Lead Tools library, the print controller 108 generates an image file with the tab caption and tab sheet main body text at a predetermined position, which position depends on the output tab document 112 paper size, paper type (e.g., five tabs or eight tabs) and tab position (one through five or one through eight, depending on the paper type).

Figure 3:
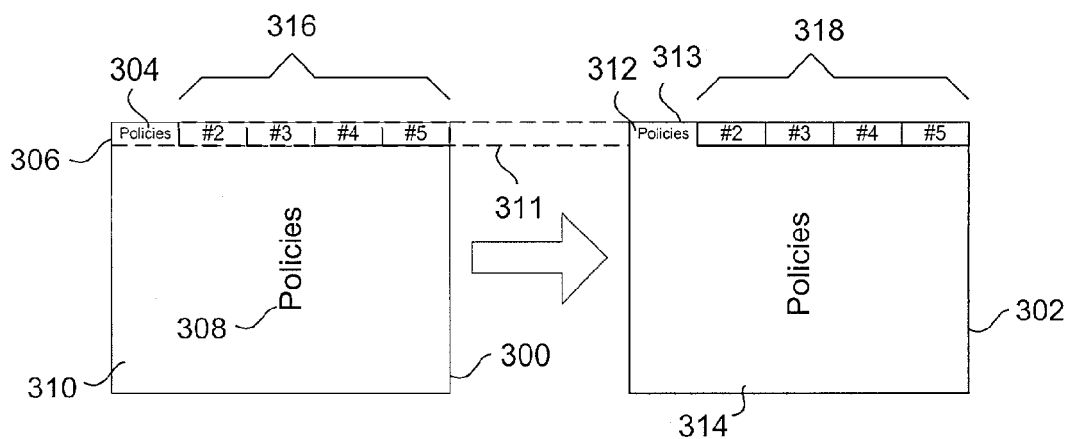
FIG. 3 illustrates a representation of an internal tab document image and corresponding tab output document, according to a disclosed embodiment.

Referring now to FIG. 3, there is illustrated a representation of an internal tab document image 300 and corresponding tab output document 302 (similar to tab document 112), according to a disclosed embodiment. As indicated hereinabove, the PJL comments define the placement of tab caption text image 304 and body text image 308 on the internal tab document image 300. The tab image information 107 comprises both the tab caption text image 304 for a tab portion area 306 of the tab document image 300, and the main body text image 308 for a main body portion 310 of tab document image 300. As illustrated, the main body text image 308 is represented by the term "Policies" placed substantially in the center of the tab document image 300. In this particular embodiment, the main body portion 310 is defined as an area bounded by a dotted line 311 that separates the tab portion 306 and the main body portion 310, and the remaining three sides of the tab document image 300.

The tab document image 300 is illustrated as a size comparable to the size of the tab output document 302 for discussion purposes, such that positioning of the tab text image 304 in predetermined locations along the tab portion area 306 facilitates printing of a corresponding tab output text 312 at an associated first tab caption location 313 on the tab output document 302. Thus the tab caption text image 304 is printed in a corresponding first tab caption location 313 on the tab output document 302. Similarly, the main body text image 308 of the tab document image 300 is printed in a corresponding output document main body location 314 of the tab output document 302.

Where a number of tab output documents 302 with differing tab information is desired, additional tab image documents 300 (in this embodiment, four additional tab images documents denoted as having tabs labeled #2–#5) including additional tab text caption images 316 (the text images of #2, #3, #4, and #5) are defined, with corresponding tab text 318 (the text of #2, #3, #4, and #5) on the tab output documents 302 (associated with the four tabs denoted as #2, #3, #4, and #5).

Note that the disclosed architecture is not restricted for use in an external network-based device (i.e., the print controller 108), but can be designed into an add-in card that is suitably adapted for use within the UNIX-based platform or the Apple-based platform, thus alleviating the need for the network-based print controller.

Alternatively, the disclosed architecture of the print controller can be designed into the communication interface of the printer (e.g., via an add-in card) such that the external network-based print controller is not required. Thus the now internalized print controller functionality interrogates the incoming text data streams to filter and route the UNIX-based or Apple-based print communications wherein the disclosed architecture operates to provide the desired tab document output at the stipulated peripheral output device.

Still alternatively, it is appreciated that the peripheral output device may be connected directly to, for example, the UNIX-based platform, such that when the user directs tab information in the form of the PJL comments to the peripheral output device, the tab information, as embedded in the text data stream, is captured and redirected over the network to the print controller 108. The parsing and resulting face file is then transmitted back from the print controller 108 to the UNIX-based platform where it is sent to the engine of the peripheral output device for generation of the tab document.

Although the preferred embodiment has been described in detail, it should be understood that various changes, substitutions, and alterations can be made therein without departing from the spirit and scope of the invention as defined by the appended claims.

What is claimed is:

1. A networked tab printing system comprising:
   means adapted for receiving, from an associated user, printer job language encoded tab data embedded in a printer job language stream having a page description language portion and a printer job language portion, which tab data is representative of desired tab output corresponding to a print out of an associated electronic document;
   means adapted for extracting tab data from the printer job language portion of the printer job language stream;
   means adapted for generating tab image files from extracted tab data; and
   means adapted for generating a print out of the associated electronic document, into which print out is incorporated an output of tab pages corresponding to generated tab image files such that document content from the page description language portion is separated by tab pages specified by the printer job language portion.

2. The networked tab printing system of claim 1, wherein the means adapted for receiving the tab data from the associated user is via a graphical user interface.

3. The networked tab printing system of claim 1 further comprising means adapted for communicating the received tab data embedded in a printer job language stream to a controller associated with at least one document rendering device.

4. The networked tab printing system of claim 1 wherein the tab data is representative of desired tab output corresponding to a print out of a plurality of associated electronic documents.

5. The networked tab printing system of claim 1 wherein the tab data includes at least one of data representative of tab caption text data and tab body text data.

6. The networked tab printing system of claim 5 wherein the tab data further includes at least one of paper size data, tab paper type data, tab position, tab caption font data, tab body font data, and tab body orientation data.

7. The networked tab printing system of claim 1 wherein the tab data is embedded in a comment format in the printer job language stream.

8. The networked tab printing system of claim 1 wherein the tab image file is generated in a face file format.

9. The networked tab printing system of claim 1 wherein the system operates on at least one of a UNIX-based platform and an Apple-based platform.

10. A networked tab printing method comprising the steps of:
   receiving, from an associated user, printer job language encoded tab data embedded in a printer job language stream having a page description language portion and a printer job language portion, which tab data is representative of desired tab output corresponding to a print out of an associated electronic document;
   extracting tab data from the printer job language portion of the printer job language stream;
   generating tab image files from extracted tab data; and
   generating a print out of the associated electronic document, into which print out is incorporated an output of tab pages corresponding to generated tab image files such that the document content from the page description language portion is separated by tab pages specified by the printer job language portion.

11. The networked tab printing system of claim 10, wherein the tab data is received from the associated user is via a graphical user interface.

12. The networked tab printing method of claim 10 further comprising the step of communicating the received tab data embedded in a printer job language stream to a controller associated with at least one document rendering device.

13. The networked tab printing method of claim 10 wherein the tab data is representative of desired tab output corresponding to a print out of a plurality of associated electronic documents.

14. The networked tab printing method of claim 10 wherein the tab data includes at least one of data representative of tab caption text data and tab body text data.

15. The networked tab printing method of claim 14 wherein the tab data further includes at least one of paper size data, tab paper type data, tab position, tab caption font data, tab body font data, and tab body orientation data.

16. The networked tab printing method of claim 10 wherein the tab data is embedded in a comment format in the printer job language stream.

17. The networked tab printing method of clam 10 wherein the tab image file is generated in a face file format.

18. The networked tab printing method of claim 10 wherein the method operates on at least one of a UNIX-based platform and an Apple-based platform.

* * * * *